United States Patent [19]

Katsukura et al.

[11] Patent Number: 5,315,302

[45] Date of Patent: May 24, 1994

[54] RADAR DETECTOR

[75] Inventors: Shuichi Katsukura, Tokyo; Mikio Iwakuni, Yachiyo, both of Japan

[73] Assignee: Uniden Corporation, Chiba, Japan

[21] Appl. No.: 974,466

[22] Filed: Nov. 12, 1992

[30] Foreign Application Priority Data

Apr. 16, 1992 [JP] Japan .................................. 4-121051

[51] Int. Cl.$^5$ ............................................... G01S 7/40
[52] U.S. Cl. ................................................... 342/20
[58] Field of Search ......................................... 342/20

[56] References Cited

U.S. PATENT DOCUMENTS

4,581,769 4/1986 Grimsley et al. ................. 342/20 X
5,068,663 11/1991 Valentine et al. ..................... 342/20

Primary Examiner—John B. Sotomayor
Attorney, Agent, or Firm—Ratner & Prestia

[57] ABSTRACT

For receiving radar waves entering an antenna horn by the heterodyne method, the system is designed so that one of the local oscillation signals produced respectively by a local oscillator for the X- and K-band radar waves, a local oscillator for the Ka-band radar wave, and a local oscillator for leaked local oscillation waves can be selected to be used as the first local oscillation signal for beating down the radar waves at a first mixer. When a radar wave has been detected in the Ka-band receiving mode with the local oscillator for the Ka-band being selected, a signal processing circuit sets the heterodyne receiving system to the leaked local oscillation wave receiving mode, selecting the local oscillator for the leaked local oscillation waves as the first local oscillator. If a radar wave is detected in this mode, the signal processing circuit inhibits a warning apparatus from issuing the regular warning.

26 Claims, 4 Drawing Sheets

RADAR DETECTOR

BACKGROUND OF THE INVENTION

1. Field of the Invention

This invention relates to a radar detector for detecting a radar wave transmitted by a "police radar gun" which is a radar apparatus used by a police for automobile speed traps.

2. Description of the Prior Art

A police radar gun is an apparatus which transmits a radar wave of a frequency ranging from microwave to millimeter wave frequencies toward a moving car and detects the frequency shift of the reflected wave. The speed of the car is determined via doppler effect. A radar detector, which is placed in an automobile to detect the existence of such police radar gun operating in the vicinity, is designed to capture those radar waves belonging to the frequency bands for the police radar gun.

Figure 1:
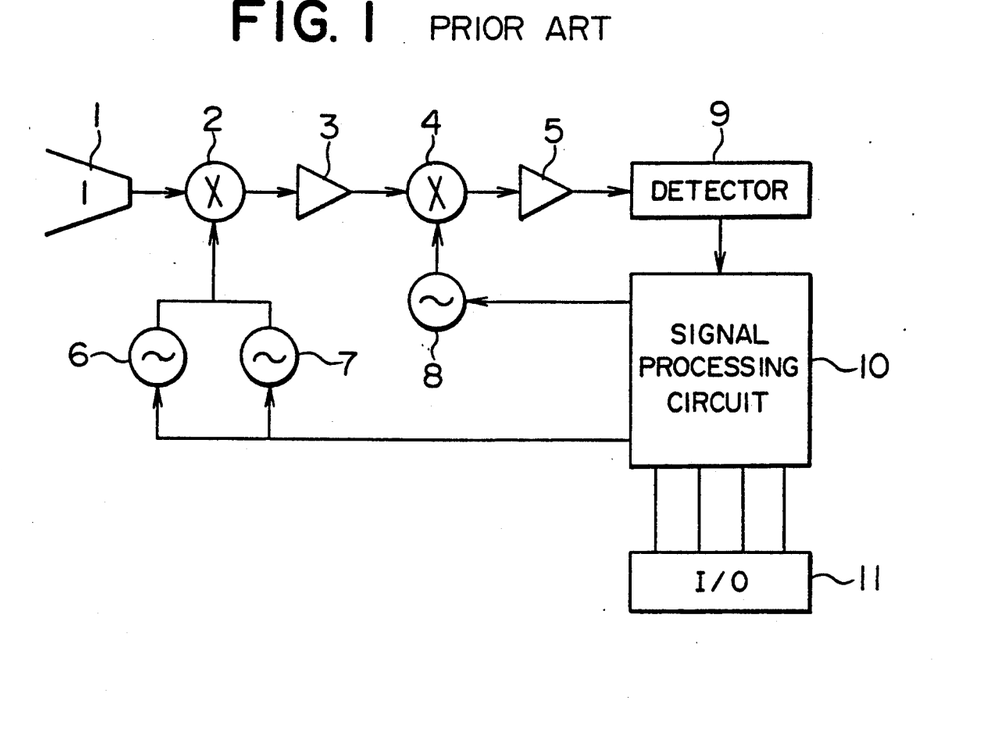
FIG. 1 is a circuit block diagram of a representative example of a prior art radar detector.

However, the detector may detect any radar wave as long as its frequency is within the detection target range even if the radar wave is not from the police radar gun. For further discussions on this, a representative configuration example of the prior art radar detector is shown in FIG. 1 and a particular example of the relationship among the frequencies in FIG. 2.

Figure 2:
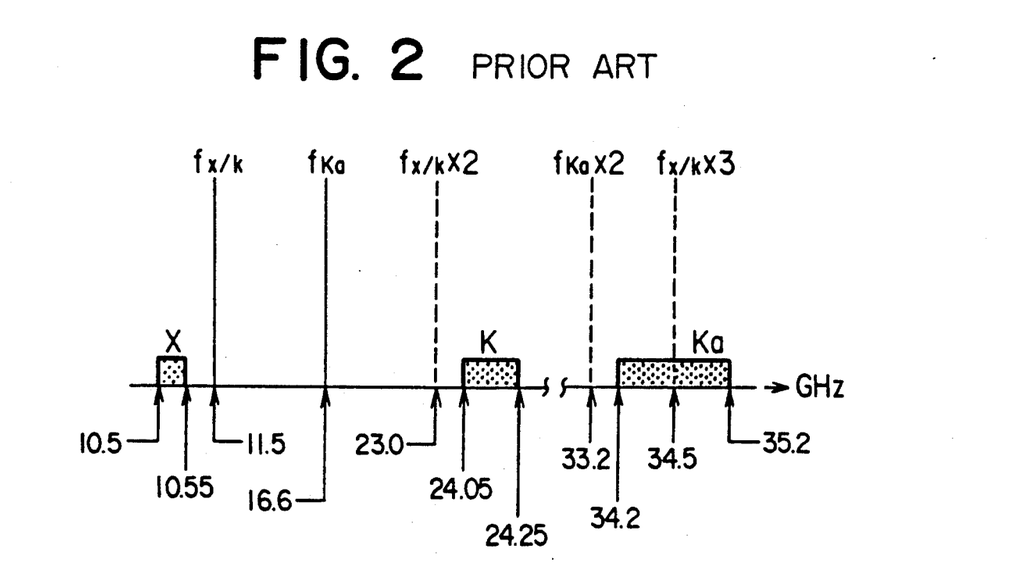
FIG. 2 is an explanatory diagram representing the relationship among the frequencies which are those of the radar waves to be detected by a radar detector such as shown in FIG. 1.

Three radar frequency bands shown below and in FIG. 2 are utilized by police radar guns in the United States of America.

X-band: 10.52±0.025 GHz
K-band: 24.15±0.1 GHz
Ka-band: 34.7±0.5 GHz

Many of the conventionally available radar detectors are designed so that they can detect all radar waves having frequencies in these three bands. In general, the frequency of a wave that is termed a microwave does not exceed 30 GHz and the frequency region exceeding that frequency is designated as a millimeter wave region. Therefore, the Ka-band mentioned above must be included in the millimeter wave region for strict discussions. In the following descriptions, however, the radar waves of the three bands are all referred to as being microwaves for convenience.

Referring now to the configuration of the prior art radar detector shown in FIG. 1, the detector is mainly a receiving system based on a heterodyne method, particularly the double heterodyne method, wherein a radar wave received by an antenna horn 1 is mixed with a first local oscillation signal at a first mixer 2 to "be beaten down" or converted to a lower frequency. The frequency of the beat down signal output from the first mixer 2 is set to around 1 GHz for the input radar waves of any above-mentioned band. Therefore, the signal frequencies of a first local oscillator fed to the first mixer 2 are inevitably defined, and the first local oscillator must oscillate at different frequencies in order to detect the radar waves in each of the respective bands, because each band occupies a respectively different frequency region. In the system of FIG. 1, two local oscillators 6 and 7 are used as the first local oscillator which are switched in a programmed sequence as controlled by a signal processing circuit 10 to operate in turn.

The local oscillator 6 is provided for the X- and K-band radar waves and its fundamental oscillation frequency $f_{X/K}$ is chosen to be 11.5 GHz for example. When the radar waves in the X-band are to be detected, the output signal of oscillator 6 (i.e. the fundamental oscillation frequency $f_{X/K}$ (=11.5 GHz) is applied to the first mixer 2 and thus the input signals of the X-band are beaten down to 0.975 GHz with respect to a center frequency.

For the detection of the K-band radar waves, the 23 GHz ($f_{X/K} \times 2 = 11.5$ GHz $\times 2$) second harmonic wave derived from the local oscillator 6's output signal of the fundamental oscillation frequency $f_{X/K}$ is advantageously exploited to beat down the K-band input signals to 1.15 GHz with respect to the center frequency. Therefore, instead of providing two exclusive first local oscillators for X-band and K-bands respectively, the fundamental oscillation signal and its second harmonic signal are both utilized so that the circuit is simplified and is reduced in size and in cost.

Another local oscillator 7, which operates according to switching instructions from the signal processing circuit 10, is used only when the Ka-band input signals are to be detected. Its fundamental oscillation frequency $f_{Ka}$ is chosen to be 16.6 GHz for example to provide the 33.3 GHz second harmonic signal, which is obtained by advantageously utilizing the non-linearity of the oscillator's transistor (not shown) used therein. This 33.3 GHz are signal is applied to the first mixer 2 as the substantial first local oscillation signal to be mixed with the Ka-band signals (center frequency: 34.7 GHz). As a result, the beat down signals of the Ka-band radar waves go out from the first mixer 2 with their center frequency at 1.5 GHz.

In FIG. 2, solid lines indicate the fundamental oscillation frequencies $f_{X/K}$ and $f_{Ka}$ of the local oscillator 6 and 7 respectively and dotted lines their respective harmonic frequencies.

The approximately 1 GHz first intermediate frequency signal, which is provided by a first IF amplifier 3, is further converted down at a second mixer 4 and then goes into a detector 9 through a second IF amplifier 5. The frequency of a local oscillation signal applied to the second mixer 4 sweeps in predetermined different ranges depending on the frequency band to be detected. These ranges are chosen so as to make the frequencies of the detected signals output from the second IF amplifier 5 to always be on the order of several tens of MHz generally for the radar waves of any frequency band mentioned above. A second local oscillator 8, which applies the oscillation signal to the second mixer 4, is formed via a voltage controlled oscillator (VCO) for example and causes it oscillation frequency to sweep in accordance with the sweep voltage signal from the signal processing circuit 10.

In a particular time sequence, the signal processing circuit 10 first puts the heterodyne receiving system comprising the circuit elements 1 through 9 into operation in an X- and K-band receiving mode. In particular, the signal processing circuit 10 activates the local oscillator 6 for the X- and K-bands to apply the fundamental oscillation signal of 11.5 GHz and the second harmonic signal of 23 GHz to the first mixer 2. The signal processing circuit 10 also instructs the second local oscillator 8 to let its oscillation frequency sweep from 0.95 GHz to 1.25 GHz. After a predetermined time period for the frequency sweeping, the signal processing circuit 10 changes the receiving mode to a Ka-band receiving mode, thereby actuating the local oscillator 7 for the Ka-band instead of the local oscillator 6 for the X- and K-bands and letting the second local oscillator 8 output a signal which sweeps in frequency from 0.95 to 2 GHz. On completion of this sweeping operation, the signal processing circuit 10 sets the heterodyne receiving system to the X- and K-band receiving mode again and thereafter repeats these operations in sequence. Note that the lower limit of the frequency sweeping range of the signal provided by the second local oscillator 8 is, for the simplicity of the design procedure, generally set to 0.95 GHz in the Ka-band receiving mode as well as in the X- and K-band receiving mode, although in the Ka-band receiving mode the limit frequency 1 GHz is suggested to be sufficient according to FIG. 2.

The detector 9 can be designed as a FM discriminator; in any of the receiving modes specified by the signal processing circuit 10, when the aforementioned signal having a frequency on the order of several tens of MHz has appeared at the output of the second IF amplifier 5, the detector 9 informs the signal processing circuit 10 of the appearance of the signal.

The signal processing circuit 10 then activates a warning system (not shown) through an appropriate I/O interface 11. For the warning system, a sound indicator apparatus using a buzzer or the like and/or a light indicator apparatus using a photodiode or the like may be utilized. Most of the recent radar detectors are equipped with both of these apparatus. With respect to the sound indication, many such radar detectors have functions for turning the sound indication on or off depending on the user's switching operation, adjusting the volume, and so forth. Note here that these functions can also be adopted in the radar detector in accordance with the present invention, which will be described later.

The prior art radar detector shown in FIG. 1, which is a multi-band radar detector capable of detecting the radar waves of any of the three bands, X- and K-, and Ka-bands, may erroneously detect the radar waves which are not exactly from the police radar gun if the waves are of the detection target frequency bands as is understood according to the operation principle described above. In some situations, the radar detector attached to a car is sometimes triggered even though there is no police radar gun in operation in the vicinity. Once the detector raises a warning, the driver reflexively slows down the car speed even if driving safely at speeds within the regulatory limits. Such false warnings, which greatly deteriorate the driving environment, are not desirable and should be reduced as much as possible.

The erroneous detection often arises from the external leakage of the local oscillation signals of other radar detectors as well as by radar apparatus, for example, adopted for automatic opening and closing doors of stores and other such equipment. As described above according to FIGS. 1 and 2, the local oscillators in the radar detectors of this type also generate, owing to their non-linearity, harmonic waves having frequencies which are the integer multiplies of the fundamental oscillation frequencies. The oscillation power of the harmonic waves are partly radiated into the air through the antenna horn 1, even though it is intended only for receiving waves. Therefore, the radar detector operating at the frequencies shown in FIG. 2 radiates, as leaked local oscillation waves, not only the fundamental oscillation wave of the frequency $f_{X/K} = 11.5$ GHz generated by the local oscillator 6 but the harmonic waves whose frequencies are two, three, four, or more times the fundamental oscillation frequency.

As is evident from FIG. 2, among the harmonic waves, the 34.5 GHz third harmonic wave of the fundamental oscillation signal for the X- and K-band signals is at a frequency within the Ka-band and so, may cause an erroneous detection of a radar signal detection, since signals of frequencies belonging to the Ka-band are the target of detection. In fact, when two cars provided with radar detectors of a similar type pass each other, the radar detectors in both cars will most likely be triggered erroneously.

SUMMARY OF THE INVENTION

The major objective of the present invention is to prevent the erroneous detection due to the leaked local oscillation waves from other radar detectors. It should be noted that a single band radar detector which only receives waves of the Ka-band will also suffer from the interference by other radar detectors which receive waves of the X-band or utilize at least the signals of frequencies around that of the first local oscillation signal, described above for receiving the X-band waves.

Restating in a more precise manner, though the three band radar detector targeting the waves of all the three bands, X-, K-, and Ka-bands, has been selected as an example for explanation, the invention is applicable to any radar detector if it targets at least the waves of the Ka-band. Thus a radar detector to which the invention is applicable may be, for example, a single band radar detector aiming only at the Ka-band waves as the detection target, or a two band radar detector targeting the waves of the Ka- and X-bands or the Ka- and K-bands, or, needless to say, a three band radar detector targeting all the waves of the X-, K-, and Ka-bands.

In addition to the major objective, it is another objective of the present invention to rationalize the frequency sweeping procedure at the second local oscillator in the radar detector that is a two band radar detector targeting at least the radar waves of the two bands, the X- and Ka-bands, or a multi-band radar detector aiming at the waves of the three bands, X-, K-, and Ka-bands, and which is used with a double heterodyne detection method described above according to the prior art radar detector. The rationalization of the frequency sweeping procedure is important since, as is shown in FIG. 2, when the waves in the Ka-band are to be detected, the sweeping range of the second local oscillation frequency for the second mixer 4 is extended to as much as approximately three times that for the X- or K-band wave detection.

In order to attain the aforementioned objects, the invention applies modifications, as will be described hereinafter, to a radar detector that comprises a heterodyne receiving system capable of selectively detecting at least the radar waves of the Ka-band among those picked up by an antenna horn and a signal processing circuit activating a warning apparatus based on the wave detection by the receiving system to provide predetermined warning.

First, the heterodyne receiving system mentioned above is designed so as to involve, in addition to the Ka-band receiving mode for detecting the radar waves of the Ka-band, a leaked local oscillation wave receiving mode wherein leaked local oscillation waves picked up by an antenna horn can be detected if the frequencies of the leaked waves are around the local oscillation frequency for the heterodyne receiving of the X-band waves.

Also, the signal processing circuit mentioned above is so designed as to inhibit the aforementioned warning from being issued via the warning apparatus when the heterodyne receiving system has detected the leaked local oscillation wave in succession to the radar waves of the Ka-band.

While the configuration described above is fundamental for a radar detector in accordance with the present invention, another preferable arrangement is also proposed where the aforementioned signal processing circuit not only inhibits the predetermined warning from being issued via the warning apparatus when the heterodyne receiving system has detected the leaked local oscillation wave in the leaked local oscillation wave receiving mode in succession to having detected the radar wave of the Ka-band in the Ka-band receiving mode, but provides a second predetermined warning different from the warning mentioned above, when such a signal is detected.

In still another arrangement, the present invention shows that the heterodyne receiving system is made not to operate all the time in the leaked local oscillation wave receiving mode. In the other arrangement, the leaked local oscillator receiving mode is used only when the system has detected the radar wave of the Ka-band, while operating in the Ka-band receiving mode, based on the instruction from the signal processing circuit.

Furthermore, the radar detector according to the present invention can also be developed into a radar detector which involves either the X-band receiving mode or the K-band receiving mode, or both of them. The invention also proposes a radar detector in which the signal processing circuit mentioned above repeats the switching between the Ka-band receiving mode and a third receiving mode which is the X-band, K-band, or X- and K-band receiving mode, and inserts, on the completion of the Ka-band receiving mode, the leaked local oscillation wave receiving mode prior to the third receiving mode.

On the other hand, the present invention also proposes a radar detector designed as follows, in order to realize a rational operation form by eliminating such inefficiency that the sizes of the time windows for respective receiving modes are different from each other.

First, supposing n is an integer greater than or equal to 2, the Ka-band is divided into successive n subbands, namely the first through n-th subbands, with the higher order subbands occupying the higher frequency regions, and the Ka-band receiving mode is also divided into the first through n-th subband receiving mode, each subband receiving mode being for detecting the waves of the Ka-subband of the order corresponding to that of the subband receiving mode. On the basis of this arrangement, the signal processing circuit provides one cycle sequence of the first through n-th subband receiving modes followed by the first mode in the next cycle.

Furthermore, supposing i is an integer greater than or equal to 1 and smaller than n, the radar detector is designed so that the signal processing circuit inserts the leaked local oscillation receiving mode between the i-th and (i+1)-th subband receiving modes and between the n-th and next cycle's first subband receiving modes, and only when in one of the n subband receiving modes a radar wave of the corresponding Ka-subband has been detected, the signal processing circuit inserts the leaked local oscillation wave receiving mode next to the last subband receiving mode wherein the radar wave has been detected.

DETAILED DESCRIPTION OF A PREFERRED EMBODIMENT

Figure 3:
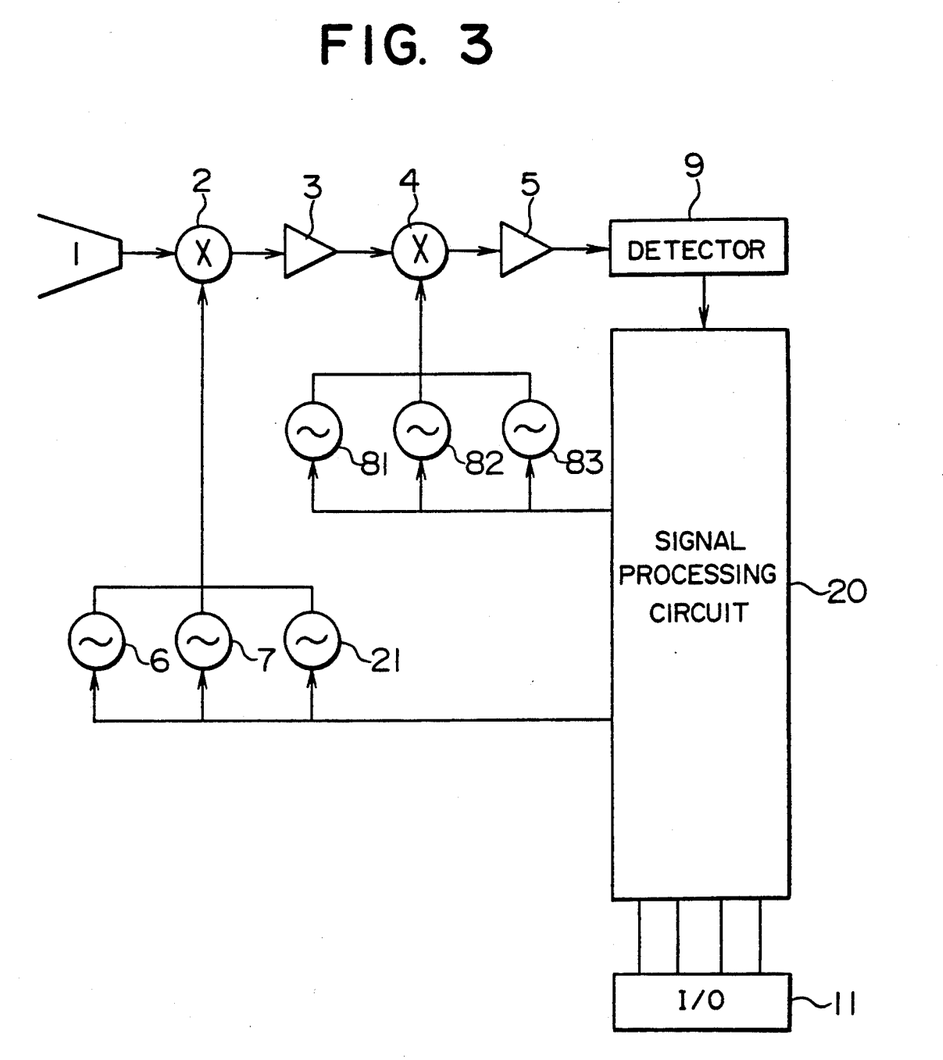
FIG. 3 is a simplified circuit block diagram of a radar detector of an embodiment according to the present invention.

In FIG. 3, a simplified circuit arrangement of an embodiment radar detector is shown in accordance with the present invention. The radar detector of FIG. 3 is configured in a modified form of the radar detector shown in FIG. 1 in order to clearly indicate, in a contrasting manner, the portions to which the invention has been applied. The elements of FIG. 3 designated by reference numerals identical to those of FIG. 1 may be the same with those of FIG. 1 or may require no modification thereof and thus detailed descriptions of these elements will not be repeated here.

The radar detector shown in FIG. 3 is a multi-band radar detector, specifically a three band radar detector, which targets the radar waves of frequencies belonging to the X-, K-, and Ka-radar frequency bands as the radar detector of FIG. 1 does. A local oscillator 6 for the X- and K-bands supplies signals of a fundamental oscillation frequency $f_{X/K}$ (for beating down X-band waves) and the second harmonic frequency $2f_{X/K}$ (for beating down K-band waves) for a first mixer 2, which reduces the frequencies of the radar waves received by an antenna horn 1 to a first intermediate frequency of around 1 GHz. This signal is amplified by, and provided as the output signal of the first IF amplifier 3. A local oscillator 7 for the Ka-band also supplies the first mixer 2 with a signal of a frequency $2f_{Ka}$ (for beating down Ka-band waves). This signal is the second harmonic frequency of the fundamental oscillation frequency $f_{Ka}$ of the oscillator 7. It is assumed here, as has been done for the example of the prior art, that the respective frequencies relates to each other as shown in FIG. 2; the fundamental oscillation frequency $f_{X/K}$ of the local oscillator 6 is 11.5 GHz and the fundamental oscillation frequency $f_{Ka}$ of the local oscillator 7 is 16.6 GHz.

Furthermore, the radar detector of the present invention is designed such that the signal of the fundamental oscillation frequency $f_{LL}$ provided by a local oscillator 21 for leaked local oscillation waves is selectively applied to the first mixer 2 upon instruction from a signal processing circuit 20; detailed descriptions of this will be presented later.

Note that a dielectric resonator oscillator, known as a microwave oscillator (DRO for abbreviation) in this field, may be exploited to form the respective local oscillators 6, 7, and 21.

The police radar gun transmits its radar waves of arbitrary frequencies in one of the X-, K-, and Ka-bands. In order to detect received waves of those arbitrary frequencies in one of the bands, signals of the frequencies of virtually the same value (for instance, several tens of MHz) must be provided at the output of a second intermediate frequency signal amplifier stage 5 (referred to as a second IF amplifier hereinafter) or at the input of a detector 9. The signals provided to the detector 9 are the received signals, beaten down to have a center frequency of around 1 GHz and output from a first intermediate frequency signal amplifier stage 3 (referred to a first IF amplifier hereinafter). Accordingly, a second mixer 4 must be supplied with a local oscillation signal which has a frequency that may sweep within frequency ranges corresponding to the respective band widths. As has been described in the foregoing, in the prior art this is achieved by the single second local oscillator 8 (FIG. 1). In the exemplary radar detector, the second local oscillator signal is provided by three oscillation sources 81, 82 and 82 in accordance with the preferable embodiment of the present invention.

The first oscillation source 81, of the second local oscillator, provides a signal with its frequency sweeping from 0.95 GHz to 1.3 GHz, and the second and third oscillation sources 82 and 83 respectively provides signals with their frequencies sweeping from 1.3 GHz to 1.65 GHz and from 1.65 GHz to 2.0 GHz for instance.

All of these elements are designed as voltage controlled oscillators (VCO for abbreviation), which can supply signals having frequencies which precisely sweep the desired frequency ranges based on the sweeping of their control voltages. The fundamental operation based on these elements is described in accordance with the timing diagram shown in FIG. 4.

Figure 4:
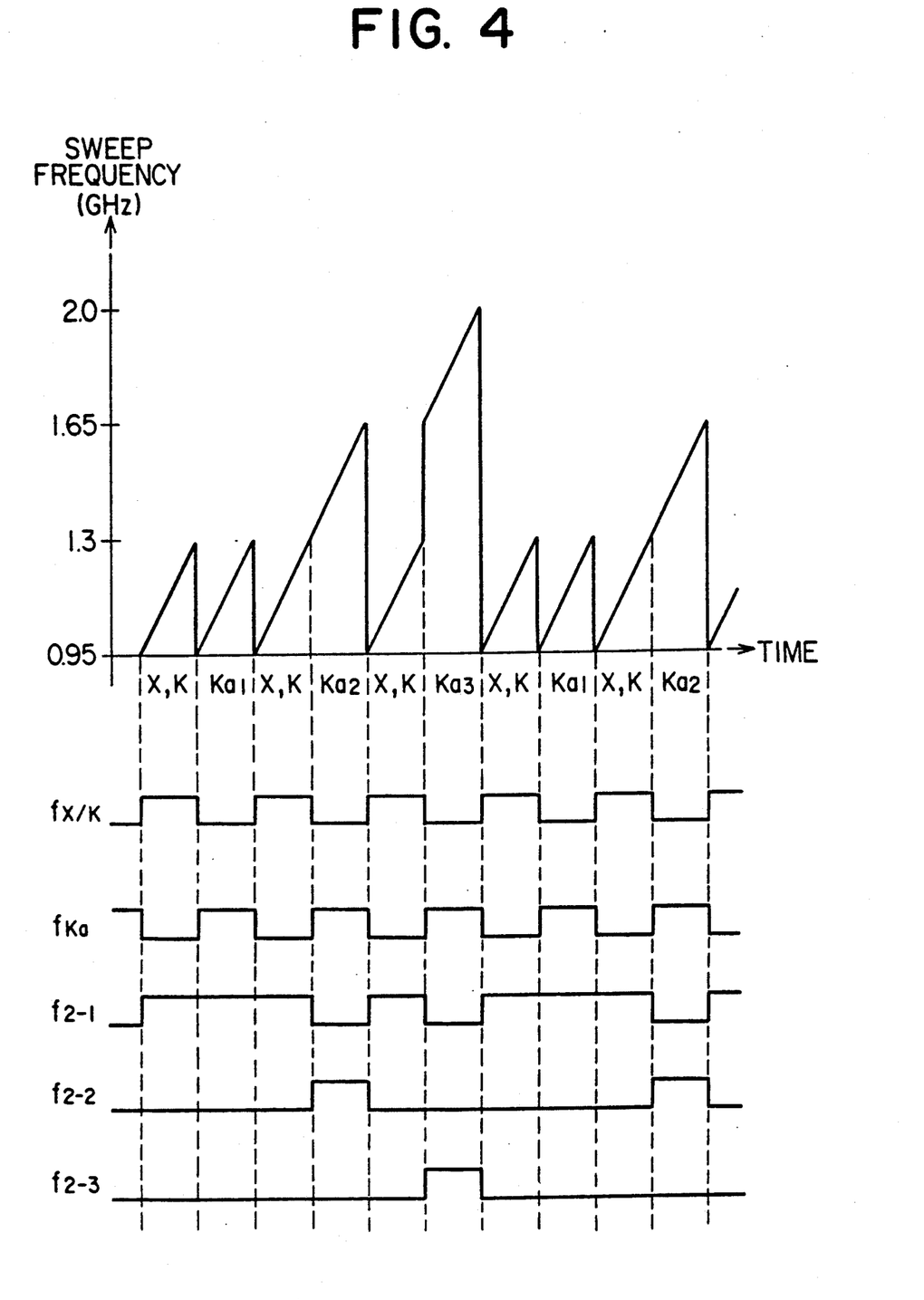
FIG. 4 is an explanatory diagram showing the operation of the radar detector of FIG. 3.

The timing diagram of FIG. 4 represents the operation timing beginning at the point when the heterodyne receiving system has entered the X-band receiving mode. In this mode, among the first local oscillators, only the local oscillator 6 for the X- and K-band operates, based on the instruction from the signal processing circuit 20, to provide the signal of the fundamental oscillation frequency $f_{X/K}=11.5$ GHz and its second harmonic signal of the frequency $2f_{X/K}$ for the first mixer 2. Therefore, in this X- and K-band receiving mode, when a radar wave of a frequency in either of those bands is received by the antenna horn 1, it is converted into a signal of a frequency between 0.95 GHz and 1 GHz. For an X-band radar wave, the signal appears at the output of the first IF amplifier 3 as is evident from the frequency relationship shown in FIG. 2. For a K-band radar wave, a signal of a frequency between 1.05 GHz and 1.25 GHz appears at the output terminal of the first IF amplifier. These signals are supplied to the following second mixer 4.

On the other hand, in this X- and K-band receiving mode the signal processing circuit 20 activates, among the three oscillation sources 81, 82, and 83, only the first oscillation source 81 as the second local oscillator, thereby providing a signal of the second local oscillation frequency $f_{2-1}$, of which sweeping range is from 0.95 GHz to 1.3 GHz, for the second mixer 4. As a result, if a X-band radar wave has been received, a signal of a specific frequency (for example several tens of MHz) appears at the output of the second IF amplifier 5. This signals appears during the time period when the second local oscillation frequency $f_{2-1}$ begins to sweep and keeps sweeping until exceeding 1 GHz: the detector 9, which may generally be designed as a FM discriminator, informs the signal processing circuit 20 of the appearance of that specific frequency signal, allowing it to judge that a radar wave has been received. If the K-band radar wave has been received, a signal of a specific frequency also appears at the output of the second IF amplifier 5 while the second local oscillation frequency $f_{2-1}$ sweeps from 0.95 GHz to 1.3 GHz, the upper limit of the sweeping range, and then the signal processing circuit 20 similarly judges that the radar wave has been received based on the information from the detector 9.

The signal processing circuit 20 successively activates a warning system, which provides a sound indication and/or a light indication, through a proper I/O interface 11 by means of a circuit system equivalent to that employed via the prior art radar detector of FIG. 1, giving a warning in a predetermined form not shown here. With respect to the form of warning, for example, a continuous or intermittent sound of a predetermined frequency, or in addition to or in place of this a blinking light display with a predetermined duty cycle and so forth may be utilized. Regarding the warning system, there are several types as has already been described in conjunction with the prior art example.

Subsequent to the time window for the X- and K-band receiving modes in which the first oscillation source 81, partly composing the second local oscillator, completes the frequency sweeping in the range of 0.95 GHz to 1.3 GHz, the system of this embodiment enters the receiving mode for the subband $Ka_1$ as shown in FIG. 4. Here, the concept "subband", which is employed in this embodiment is described. This concept has not appeared in the prior art.

The band width of the X-band is 50 MHz as is appeared form FIG. 2 and that of the K-band 200 MHz. In contrast to this, the Ka-band width is as much as 1 GHz. Therefore, if no modification is applied, the sweeping of the second local oscillation frequency for the second mixer 4 requires different time periods according the frequency bands. Also, when the second local oscillator is formed by a voltage controlled oscillator, the sweeping range of the control voltage should be varied with respect to the frequency bands. This has a disadvantage in designing the system and imposes restrictions on the circuit arrangement.

The inventor therefore had divided the Ka-band having the broadest band width into a plurality of subbands, preferably three bands, in particular subbands $Ka_1$, $Ka_2$, and $Ka_3$ each having the same width. Correspondingly three local oscillation frequencies $f_{2-1}$, $f_{2-2}$, and $f_{2-3}$ are provided for the second mixer 4. The frequency $f_{2-1}$ in a range of 0.95 to 1.3 GHz generated by the first oscillation source 81 is utilized to receive the waves of the first subband $Ka_1$. The frequency $f_{2-2}$ in a range of 1.3 to 1.65 GHz generated by the second oscillation source 82 is used to receive the waves of the second subband $Ka_2$. The frequency $f_{2-3}$ in a range of 1.65 to 2.0 GHz generated by the third oscillation source 83 is used to receive the waves of the third subband $Ka_3$. It is then very clear that such an arrangement results in an identical frequency sweeping range of 350 MHz for all the subbands and this sweeping range is also identical to that of the frequency sweeping performed for the signals of the X- and K-bands successively in the X- and K-band receiving mode as mentioned above. As a result, all the time periods required by the respective subband receiving modes for the respective Ka-subbands are equalized to each other, so that not only the circuit design is greatly simplified but efficient frequency sweeping operations are realized.

Furthermore in this embodiment, as shown in FIG. 4, a first X- and K-band receiving mode is inserted between the first subband receiving mode associated with the first Ka-subband $Ka_1$ and the second subband receiving mode associated with the second Ka-subband $Ka_2$. In addition, a second X- and K-band receiving mode is inserted between the second receiving mode associated with the second Ka-subband $Ka_2$ and the third subband receiving mode associated with the third Ka-subband $Ka_3$. The combination of all band and subband receiving modes is one cycle: this cycle is repeated with still another X- and K-band receiving mode inserted between the third subband receiving mode and the first subband receiving mode for the next cycle.

Referring to FIG. 4 for the description concerning this arrangement of the receiving modes the signal processing circuit 20 deactivates the local oscillator 6, on completion of the first X- and K-band receiving mode mentioned above. Next, the signal processing circuit 20 activates the local oscillator 7 for the Ka-band. However, the first oscillation source 81 is still being selected as the second local oscillator. Therefore, in this receiving mode for the first Ka subband $Ka_1$, only when a radar wave of a frequency belonging to the about one third, lowest frequency portion of the Ka-band has been received by the radar horn 1, the signal processing circuit 20 detects that radar wave through the detecting 9 and activates the warning system to issue a predetermined warning.

After the receiving mode for the first Ka-subband $Ka_1$ has been completed, the signal processing circuit 20 again specifies the X- and K-band receiving mode for the judgment on whether radar waves of the X- and K-bands are sensed or not based on the mechanism as described above.

The signal processing circuit 20 then instructs the heterodyne receiving system to enter the receiving mode for the second Ka-subband $Ka_2$; in particular the signal processing circuit 20 causes the local oscillator 7 for the Ka-band to operate as the oscillation source of the first local oscillator and the second oscillation source 82 as the oscillation source of the second local oscillator. Consequently, in this receiving mode, only when a radar wave of a frequency in about the middle one third of the Ka-band has entered the antenna horn 1, will the signal processing circuit 20 activate the warning system.

After that, in order to set the system to the X- and K-band receiving mode again, signal processing circuit 20 selects the local oscillator 6 for the X- and K-bands to put it into operation and also selects the first oscillation source 81 as the oscillation source of the second local oscillator; the signal processing circuit 20 then judges whether waves of the X- and K-bands have been received or not on the basis of the mechanism described above.

For the purpose of realizing the receiving mode for the third Ka-subband $Ka_3$, the signal processing circuit 20 then selects the local oscillator 7 for the Ka-band and the third oscillation source 83 to make them operate as the first local oscillator and the second local oscillator respectively; the signal processing circuit 20 judges whether a radar wave of a frequency belonging to the uppermost one-third frequency portion, approximately, of the Ka-band has been sensed or not. Next, the system is set to the X- and K-band receiving mode again and the repetition of these sequential procedures follows.

The frequency sweeping sequence described above is also extremely preferable to increase the probability for the detection of the X- and K-band radar waves. If the system is designed so that the frequency sweeping is performed at a time in the entire wide range of the Ka-band, a Ka-band radar wave transmitted from a police radar gun occupies only a point in the wide Ka-band with respect to the frequency, and during this broad range sweeping, the radar waves of the X- and K-bands may not be detected even if they have entered the antenna horn 1. Therefore in this case, a much longer time is needed in the radar wave detection. On the contrary, in the embodiment radar detector based on the concept by which the Ka-band is divided into a plurality of subbands, the probability for the detection of the X- and K-band radar waves is enhanced in view of time, while the probability for the detection of the Ka-band radar waves is by no means degraded.

As described above, however, other radar waves which are not the true target waves from the police radar gun but are particularly those of the third harmonic frequency of the fundamental frequency $f_{X/K} = 11.5$ GHz, which is the frequency of the first local oscillation signal used to detect the X- and K-bands in this embodiment, or of the fundamental frequency around 11.5 GHz may be received by the antenna horn 1, during the repetition of the receiving modes for the respective bands and subbands in accordance with the predetermined sequence. These waves of the third harmonic frequency $3f_{X/K}$ or those around it, as evidently shown in FIG. 2, present the same frequencies with the true radar waves in the Ka-band, so that in the prior art system without any countermeasures, the waves are often erroneously detected, and the warnings in the predetermined form are raised. On the contrary, the following measures are taken in this embodiment of the present invention to reduce the possibility of the erroneous detection as much as possible.

First, a local oscillator 21 for leaked local oscillation waves, whose oscillation frequency $f_{LL}$ is set to 13 GHz in this case, is provided as the first local oscillator supplying a signal of the first local oscillation frequency for the first mixer 2, in addition to the local oscillators 6 and 7 for the regular bands described above; the local oscillator 21 is intended to enable the detection of the radar waves of a predetermined frequency band with its center frequency corresponding to the local oscillation frequency $f_{X/K}$ of the X- and K-band waves. The local oscillator 21 operates, in this embodiment, not always at predetermined intervals but operates in the form shown in FIG. 5.

Figure 5:
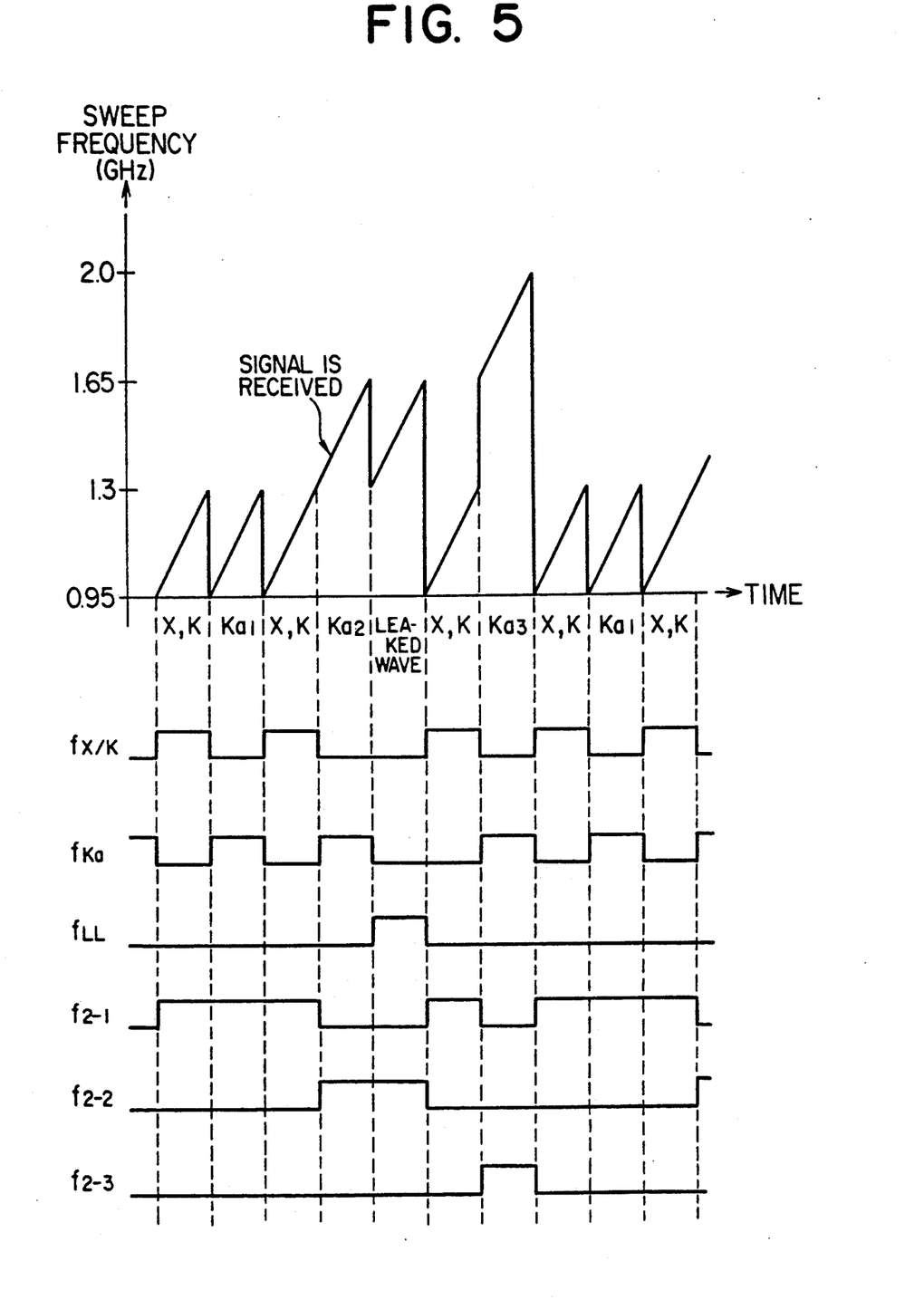
FIG. 5 is an explanatory diagram representing the operation of the radar detector shown in FIG. 3 for judging whether the received radar wave is of the true target or not.

The beginning portion of the timing chart shown in FIG. 5 is identical to that of the timing chart shown in FIG. 4. Namely, the receiving mode for the first subband $Ka_1$ of the Ka-band follows the first X- and K-band receiving mode, and then the second X- and K-band receiving mode is set again and succeeded by the receiving mode for the second subband $Ka_2$. The timing chart of FIG. 5, however, is of the case where a received radar wave is detected in the receiving mode for the second subband $Ka_2$ as indicated by a note "signal is received" with an arrow.

In that case, the radar detector according to the embodiment shifts to the judging step for judging whether the detection by the signal processing circuit 20 is correct or not. This step is required since the received radar wave in the Ka-band may not be the true radar wave form a police radar gun but may be a leaked wave of the third harmonic wave arising from the first local oscillation signal produced by the local oscillator for X- and K-bands in a radar detector attached to another car passing. In other words, if a signal of the local oscillation frequency $f_{X/K}=11.5$ GHz for the X-band or a signal of a frequency around thereof, it is detected after a radar wave of Ka-band has been detected, it can be concluded with high certainty that the detected wave is the leaked local oscillation wave from another radar detector, and the received wave of the Ka-band is not the true radar wave but the leaked third harmonic wave of the local oscillation signal for the X-band in another radar detector. Therefore in this embodiment, the step is added wherein waves of the local oscillation frequencies for the X-band are detected, recognizing them as the leaked local oscillation waves from other radar detectors.

Referring to FIG. 5, detecting that a radar wave has been received in one of the Ka-subband receiving modes (in the $Ka_2$ subband receiving mode, according to the frequency relationship mentioned above), the signal processing circuit 20 changes the predetermined sequence described above to insert the leaked local oscillation wave receiving mode after, preferably just after, the Ka-subband receiving mode wherein the picked up radar wave has been detected. In this leaked local oscillation wave receiving mode, the signal processing circuit 20 selects the local oscillator 21 for leaked local oscillation waves, which is provided in accordance with the invention, to supply the first mixer 2 with the oscillator signal of the frequency $f_{LL}=13$ GHz. For the second mixer 4, the signal processing circuit 20 selects the signal of the frequency $f_{2-2}$ sweeping in a range of 1.3 to 1.65 GHz supplied by the second oscillation source 82.

As a result, if a leaked wave of a frequency identical to the local oscillation frequency $f_{X/K}=11.5$ GHz for the X- and K-bands employed in this embodiment has entered the antenna horn 1, the first IF amplifier 3 outputs a signal of 1.5 GHz, allowing the second IF amplifier 5 to output a signal of a frequency in the specified frequency region for the detector 9. Receiving this signal, the detector 9 provides a signal indicating the detection of the leaked local oscillation wave for the signal processing circuit 20. Sensing this signal, the signal processing circuit 20 inhibits the predetermined warning from being issued by the warning system. In other words, the signal processing circuit 20 of this embodiment activates the warning apparatus to issue the warning only when the leaked wave is not detected in the leaked local oscillation wave receiving mode, since in that case the detected wave can be judged to be the true radar wave transmitted from a police radar gun.

It should be noted that other radar detectors may utilize such first local oscillation fundamental frequencies that slightly differ from the frequency $f_{X/K}=11.5$ GHz employed in this embodiment. However, the radar detector of the embodiment can afford such frequency deviations and equally detect the leaked waves of those frequencies, if the deviations are within the frequency sweeping range ($\pm 175$ MHz in this case) of the second oscillation source 82 forming a portion of the second local oscillator. As mentioned above, the waves which are detected in this way are of course not necessarily those actually leaked from local oscillators in radar detectors installed in other cars. Therefore, it can be said in other words that the radar detector according to the invention can detect all of those interfering waves.

When the leaked local oscillator wave receiving mode is added, and the leaked wave is detected after the detection of radar waves of the Ka-band according to the invention, the circuit that inhibits the signal for activating the warning system must be added to the particular circuit configuration of the signal processing circuit 10 (FIG. 1) in a known existing radar detector to prevent false alarm. It is very simple for an engineer in this field to design that circuit since it is only a problem of designing.

Furthermore, it is also simple for those skilled in the art to modify the system so as to not only inhibit, on the detection of a leaked wave, the predetermined warning for the true radar wave from being issued but raise the second predetermined warning by using the technology known in the field. For instance, if the warning system provides a continuous or intermittent sound of a predetermined frequency as a predetermined regular warning, the second predetermined warning indicating the leaked wave detection can be a continuous or intermittent sound of a different frequency or an intermittent sound of the same frequency but of different intervals. Utilizing a sound of different volume is also possible. Further, when the predetermined regular warning is issued by both sound and light, the second predetermined warning can be given only by light or by light of a different magnitude. Needless to say, another light emitting device different from the one for the regular warning can be employed exclusively to provide the second predetermined warning for the leaked wave detection. Any type of warnings, in short, may be employed for the second predetermined warning, if it can be discriminated apparently from the warning for the Ka-band radar wave detection.

In any case, on the basis of the present invention, the possibility of the erroneous detection due to other radar waves, such as the leaked local oscillation waves from the local oscillators in other radar detectors, which are around the X-band local oscillation frequency, can be reduced, since these false waves may be discriminated at least from true waves. As a result, an increased reliability of the radar detector and a comfortable driving environment can be provided.

A variety of modifications applicable to the invention, including other changes for the above-described embodiment, are presented hereinafter.

First, the major objective of the present invention is, as was stated above, to reduce the erroneous operation due to the leaked local oscillation waves from other radar detectors. Therefore, in the case where only the major objective is intended to be attained, such an arrangement that the frequency sweeping of the second local oscillation signal with respect to the Ka-band is performed at a time in the entire range of the Ka-band, as is done for the prior art, can also be adopted.

As was briefly mentioned above, the present invention is equally applicable to those radar detectors targeting at least the Ka-band waves for detection as well as the multi-band radar detectors targeting the X-, and K-, and Ka-based waves shown in the drawing. Radar detectors, such as single-band radar detectors targeting only the waves of Ka-band or two-band radar detectors targeting the waves of the X- and Ka-bands or the K- and Ka-bands, can also be effectively improved by the present invention.

Also, concerning to the leaked local oscillation wave receiving mode, the following modification is applicable. While the exclusive local oscillator 21 for receiving the leaked waves is incorporated as the first local oscillator in the depicted embodiment, the local oscillator 6 for the X-band can be employed, during the leaked local oscillation wave, receiving mode, in place of the local oscillator 21 by slightly shifting the oscillator 6's fundamental oscillation frequency from $f_{X/K} = 11.5$ GHz to $f_{LL} = 13$ GHz.

In the depicted embodiment, the second local oscillator is composed of the first, second, and third oscillation sources 81, 82, and 83 formed respectively by a voltage controlled oscillator. This configuration contributes to clearly show the arrangement wherein the radar waves of the three Ka-subbands are sequentially set to be the detection targets. However, the three oscillators 81, 82, and 83 may be replaced by only one voltage controlled oscillator with a modified control voltage for frequency sweeping, which provides substantially the same result.

Furthermore, the number of the subbands composing the Ka-band can be set to two or to more than three depending on the relationship among the frequencies employed, and it is also possible to divide the Ka-band into subbands of different bandwidths. In this case, the following arrangement may be employed. Supposing n, for generalization, is an integer greater than or equal to 2, the Ka-band is divided into n successive subbands, the first through n-th subbands, with the higher order subbands occupying the higher frequency regions, and correspondingly to this the Ka-band receiving mode is also divided into the first through n-th subband receiving modes, each subband receiving mode being for receiving the radar waves of the Ka-subband of the order corresponding to that of the receiving mode. Under this arrangement, the signal processing circuit 20 provides one cycle sequence of the first through n-th subband receiving modes followed by the first mode in the next cycle.

And then, supposing i is an integer greater than or equal to 1 and smaller than n, the signal processing circuit 20 inserts the above-mentioned X- and K-band receiving mode between the i-th and (i+1)-th subband receiving modes and between the n-th and next cycle's first subband receiving modes, and when in one of the n subband receiving modes a radar wave of the corresponding Ka-subband has been detected, the signal processing circuit 20 further inserts the leaked local oscillation wave receiving mode next to the last subband receiving mode wherein the radar wave has been detected.

The embodiment shown in the drawing exploits the heterodyne method, in particular the double heterodyne method. However, it is obvious that the spirit of the present invention is applicable to a system based on the single heterodyne method, wherein the oscillation frequencies of the first local oscillators 6, 7, and 21 themselves are made to sweep. That is, the invention can be applied to a radar detector which comprises only one beating down system corresponding to the circuit consists of the first mixer 2 and the first local oscillators 6, 7, and 21 but does not include the second mixer 4 or the second local oscillator 8 (81, 82, and 83).

The invention claimed is:

1. Apparatus suitable for use in a radar detector having an antenna horn for receiving radar waves including Ka-band radar waves, a heterodyne receiving system for selectively detecting at least ones of the Ka-band radar waves among the radar waves received by said antenna horn, and a signal processing circuit for activating a warning system to issue a predetermined warning based on a radar wave detection by said heterodyne receiving system, said apparatus comprising:

a Ka-band receiving means for selectively receiving the radar wave of said Ka-band;

a leaked local oscillation wave receiving means for detecting leaked local oscillation waves radiated from other radar detectors which leaked local oscillation waves are of frequencies substantially corresponding to local oscillation signals used to receive X-band waves by a heterodyne method; and wherein said signal processing circuit comprises means for inhibiting said warning system from issuing said predetermined warning when said leaked local oscillation wave receiving means has detected the leaked local oscillation waves after said Ka-band receiving means has detected the radar wave of said Ka-band.

2. A radar detector according to claim 1, wherein said signal processing circuit further comprises means for activating the warning system to produce another warning different from said predetermined warning responsive to the means for inhibiting the warning system.

3. A radar detector according to claim 1 or 2, wherein said signal processing circuit further comprises means, responsive to said Ka-band receiving means for activating said leaked local oscillation wave receiving means immediately after said Ka-band receiving means only when said Ka-based receiving means has detected the radar wave of said Ka-band.

4. A radar detector according to claim 1 or 2, wherein: said antenna horn receives X-band or K-band radar waves in addition to the Ka-band radar waves, said heterodyne receiving system further includes a third receiving means including a local oscillator for detecting the radar waves of at least one of said X-band and said K-band;

said Ka-band receiving means and said third receiving means are alternately and repeatedly activated by said signal processing circuit; and said leaked local oscillation wave receiving means is activated between the activation of said Ka-band receiving means and said third receiving means by said signal processing circuit.

5. A radar detector according to claim 4, wherein:

said Ka-band is divided into successive n subbands, originally numbered first through n-th n being an integer greater than 1, wherein each of the first through n-th subbands occupies a successively higher band of frequencies in said Ka-band;

said Ka-band receiving means comprises first through n-th subband receiving means for detecting waves which occupy respective ones of the n Ka subbands;

said signal processing circuit comprises means for activating each of said first through n-th subband receiving means before again activating said first subband receiving means; and said signal processing circuit further comprises means for activating said third receiving means between activation of said i-th and (i+1)-th subband receiving means, wherein i is an integer greater than zero and less than n, and immediately after the activation of said n-th subband receiving means, and when one of said n Ka-subband receiving means detects a radar wave of said corresponding Ka-subband, said signal processing circuit activates said leaked local oscillation wave receiving means immediately after the activation of the one of said Ka-subband receiving means which detected said radar wave.

6. A radar detector according to claim 5, wherein the Ka-band receiving means includes three Ka-subband receiving means.

7. A radar detector according to claim 5, wherein the Ka-band receiving means includes three Ka-subband receiving means each of said three Ka-subband receiving means covers a substantially equal range of frequencies.

8. A radar detector according to claim 7, wherein: said third receiving means comprises heterodyne means, responsive to an oscillation signal, provided by the local oscillator and having a fundamental oscillation frequency for receiving radar waves which occupy said X-band; wherein the frequency of said local oscillation signal utilized by said heterodyne means is the fundamental oscillation frequency of the local oscillator used by the heterodyne means to receive the X-band waves; and the leaked local oscillation wave receiving means comprises means for shifting the fundamental frequency of said local oscillator to provide a further local oscillation signal utilized by the leaked local oscillation wave receiving means to receive said leaked local oscillation waves.

9. A radar detector according to claim 1 or 2, wherein said leaked local oscillation wave receiving means includes a local oscillator provided exclusively for producing a local oscillation signal which is used to receive said leaked local oscillation waves.

10. A radar detector according to claim 3, wherein: said antenna horn receives X-band and K-band radar waves in addition to the Ka-band radar waves, said heterodyne receiving system further includes a third receiving means including a local oscillator for detecting the radar waves in at least one of said X-band and said K-band;

said K-band receiving means and said third receiving means are alternately and repeatedly activated by said signal processing circuit; and said signal processing circuit further comprises means, responsive to the Ka-band receiving means, for activating said leaked local oscillation wave receiving means between the activation of said Ka-band receiving means and the activation of said third receiving means.

11. A radar detector according to claim 10, wherein: said Ka-band is divided into successive n subbands, originally numbered first through n-th n being an integer greater than 1, wherein each of the first through n-th subbands occupies a successively higher band of frequencies in said Ka-band;

said Ka-band receiving means comprises first through n-th subband receiving means for detecting waves which occupy respective ones of the n Ka subbands;

said signal processing circuit comprises means for activating each of said first through n-th subband receiving means before again activating said first subband receiving means; and said signal processing circuit further comprises means for activating said third receiving means between activation of said i-th and (i+1)-th subband receiving means, where i is an integer greater than zero and less than n, and immediately after the activation of said n-th subband receiving means, and when one of said n Ka-subband receiving means detects a radar wave of said corresponding Ka-subband, said signal processing circuit activates said leaked local oscillation wave receiving means immediately after the activation of the one of said Ka-subband receiving means which detected said radar wave.

12. A radar detector according to claim 11, wherein the Ka-band receiving means includes three Ka-subband receiving means.

13. A radar detector according to claim 11, wherein the Ka-band receiving means includes three Ka-subband receiving means each of said three Ka-subband receiving means covers a substantially equal range of frequencies.

14. A radar detector according to claim 13, wherein: said third receiving means comprises heterodyne means, responsive to an oscillation signal provided by the local oscillator and having a fundamental oscillation frequency for receiving radar waves which occupy said X-band; wherein the frequency of said local oscillation signal utilized by said heterodyne means is the fundamental oscillation frequency of the local oscillator used by the heterodyne means to receive the X-band waves; and the leaked local oscillation wave receiving means comprises means for shifting the fundamental frequency of said local oscillator to provide a further local oscillation signal utilized by the heterodyne means to receive said leaked local oscillation waves.

15. A radar detector according to claim 14, wherein said leaked local oscillation wave receiving means includes a local oscillator provided exclusively for producing a local oscillation signal which is used to receive said leaked local oscillation waves.

16. A radar detector according to claim 3, wherein said leaked local oscillation wave receiving means includes a local oscillator provided exclusively for producing a local oscillation signal which is used to receive said leaked local oscillation waves.

17. A radar detector according to claim 4, wherein said leaked local oscillation wave receiving means includes a local oscillator provided exclusively for producing a local oscillation signal which is used to receive said leaked local oscillation waves.

18. A radar detector according to claim 5, wherein said leaked local oscillation wave receiving means includes a local oscillator provided exclusively for producing a local oscillation signal which is used to receive said leaked local oscillation waves.

19. A radar detector according to claim 6, wherein said leaked local oscillation wave receiving means includes a local oscillator provided exclusively for producing a local oscillation signal which is used to receive said leaked local oscillation waves.

20. A radar detector according to claim 7, wherein said leaked local oscillation wave receiving means includes a local oscillator provided exclusively for producing a local oscillation signal which is used to receive said leaked local oscillation waves.

21. A radar detector according to claim 8, wherein said leaked local oscillation wave receiving means includes a local oscillator provided exclusively for producing a local oscillation signal which is used to receive said leaked local oscillation waves.

22. A multi-band radar detector, said radar detector comprising:

antenna means for receiving radar waves within a first band of frequencies and a second band of frequencies;

first receiving means for heterodyning a selected one of the radar waves within said fist and second bands of frequencies with an oscillation signal to generate a first detection signal;

signal processing means comprises means for activating a warning alarm in response to the presence of said first detection signal; and second receiving means for detecting waves other than said selected radar wave to generate a second detection signal;

wherein the signal processing means further comprises inhibiting means for preventing the activation of said warning alarm when said first detection signal and said second detection signal have been generated.

23. The apparatus of claim 22 further comprising means for generating said oscillation signal, wherein the frequency of said oscillation signal is a first frequency when said selected radar wave is within said first band of frequencies and a second frequency when said selected radar wave is within said second band of frequencies.

24. The apparatus of claim 23 wherein said second receiving means comprises means for detecting waves having a frequency substantially the same as said first frequency of said oscillation signal, as said waves other than said selected radar wave, when said selected radar wave is within said second band of frequencies.

25. The apparatus of claim 24 wherein said antenna means includes means for receiving radar waves having frequencies in the X-band as the radar waves within the first band of frequencies.

26. The apparatus of claim 25 wherein said antenna means includes means for receiving radar waves having frequencies in the Ka-band as the radar waves within the second band of frequencies.

* * * * *

UNITED STATES PATENT AND TRADEMARK OFFICE
CERTIFICATE OF CORRECTION

PATENT NO. : 5,315,302
DATED : May 24, 1994
INVENTOR(S) : Katsukura et al.

It is certified that error appears in the above-identified patent and that said Letters Patent is hereby corrected as shown below:

Col. 14, line 36, delete "or" and insert --and--.

Col. 17, line 9, delete "fist" and insert --first--.

Signed and Sealed this

First Day of November, 1994

*Attest:*

BRUCE LEHMAN

*Attesting Officer*     *Commissioner of Patents and Trademarks*